Oct. 10, 1967 P. A. KIRSTEN 3,346,027
KNIFE DISC WOOD CUTTING MACHINE
Filed Aug. 19, 1965 7 Sheets-Sheet 2

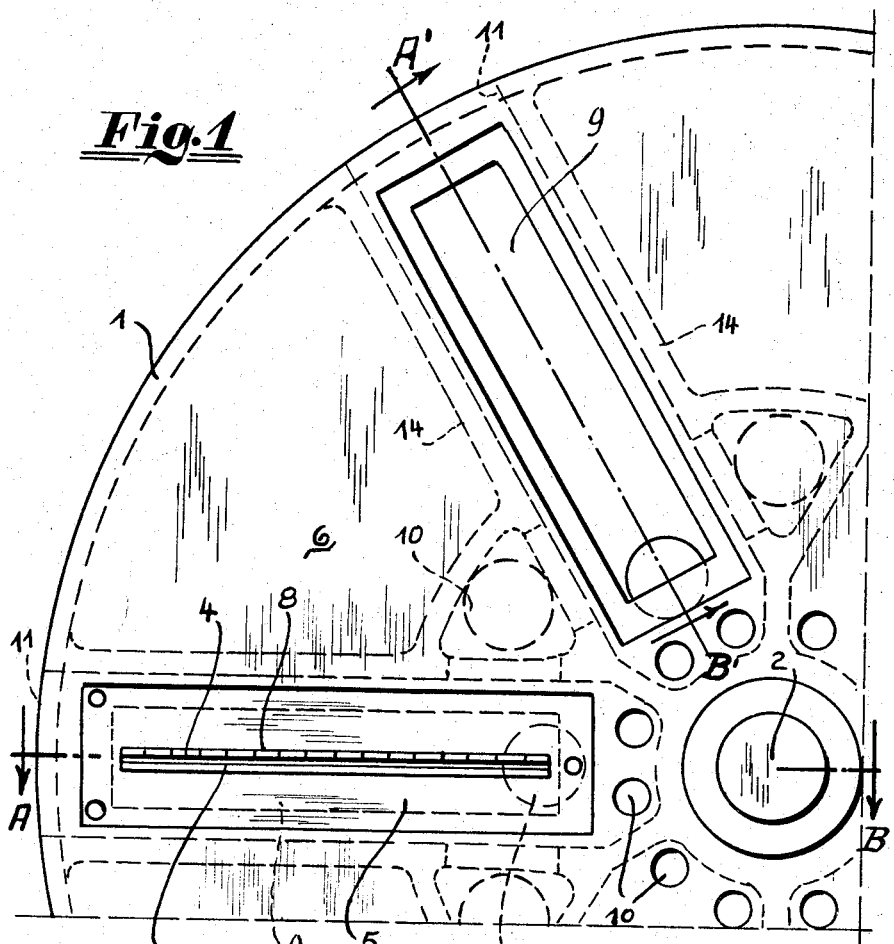
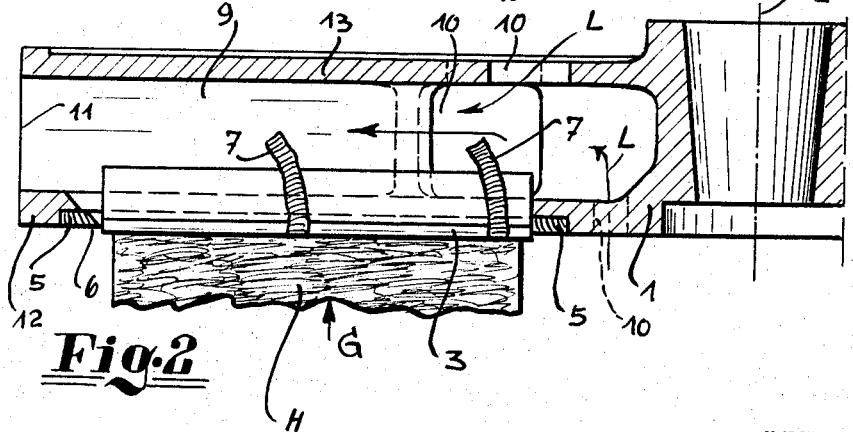

INVENTOR.
Paul Arthur Kirsten
BY
ATTYS.

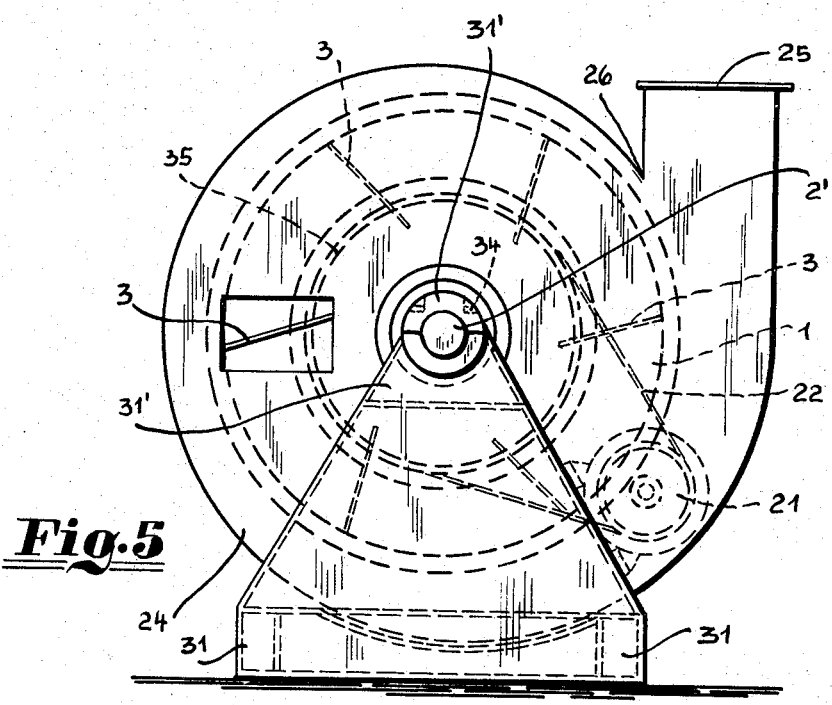
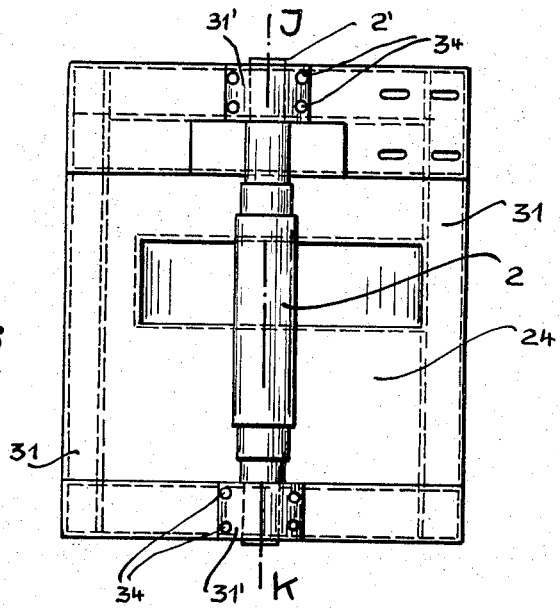

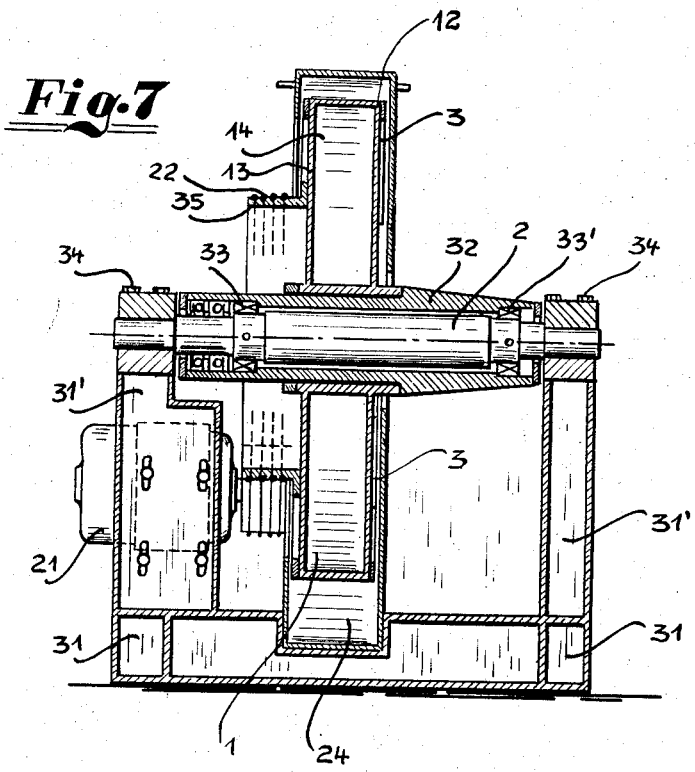

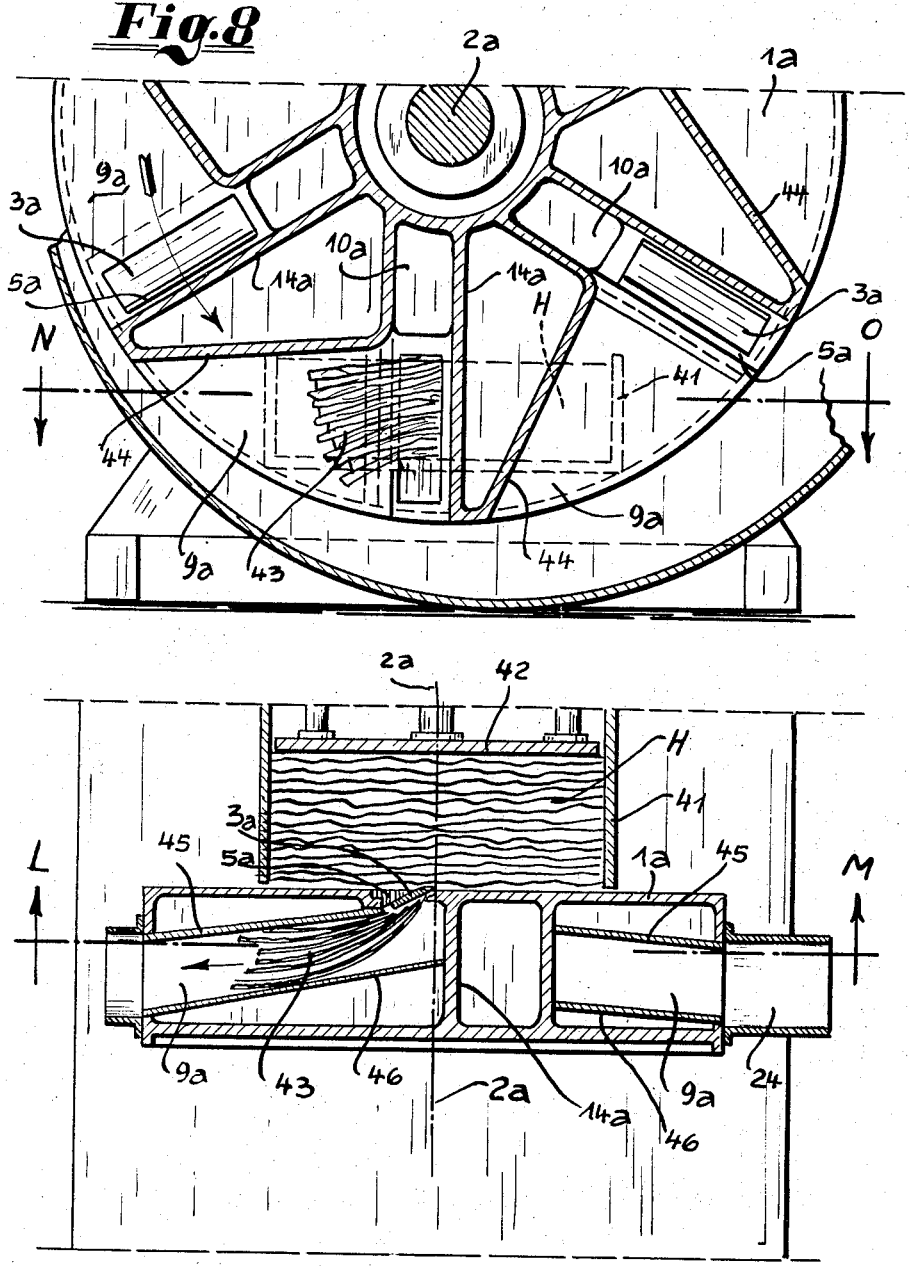

Oct. 10, 1967  P. A. KIRSTEN  3,346,027
KNIFE DISC WOOD CUTTING MACHINE
Filed Aug. 19, 1965  7 Sheets-Sheet 6

INVENTOR.
Paul Arthur Kirsten
BY
Attys.

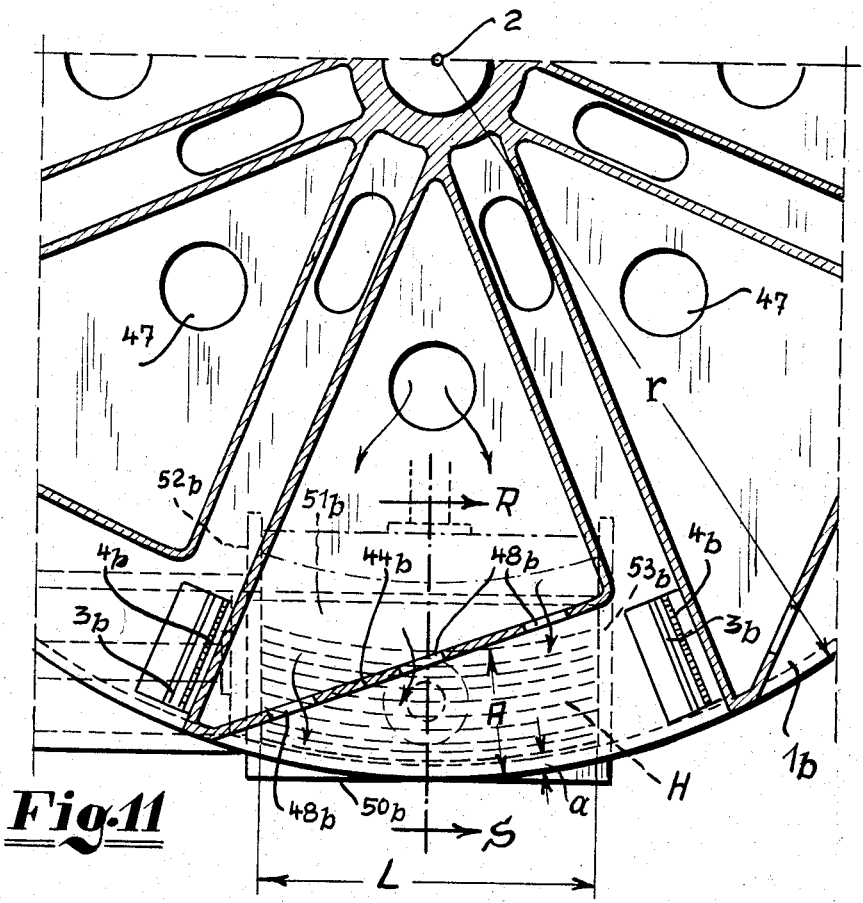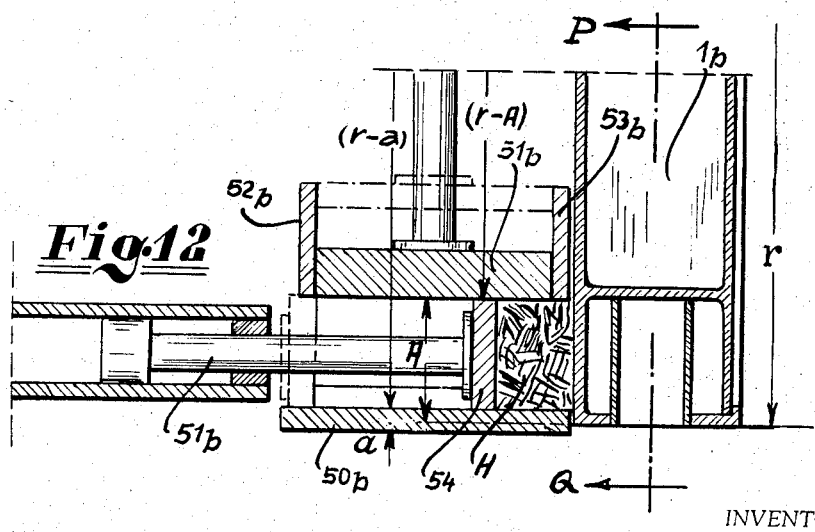

United States Patent Office 3,346,027
Patented Oct. 10, 1967

3,346,027
KNIFE DISC WOOD CUTTING MACHINE
Paul Arthur Kirsten, Ernst-Moritz-Arndt-Strasse 6, 5302
Beuel, near Bonn, Germany
Filed Aug. 19, 1965, Ser. No. 480,941
9 Claims. (Cl. 144—176)

ABSTRACT OF THE DISCLOSURE

An apparatus for producing thin wood shavings including a rotary cutting head having cutting knives carried thereon, channels within the cutting head which receive and conduct the wood shavings to a housing disposed about the cutting head, and air passages within the cutting head to assist in outward discharge of the wood shavings.

This invention relates to rotary wood cutting machines for producing thin wood shavings for use in the wood panel industry and other industrial operations such as, for example, the production of cellulose and related industries.

In known machines of the character stated, the wood shavings are delivered from the knives to a space between the knife disk and an associated housing, from which space they are discharged by centrifugal action and air flow incident to rotation of the disk. The disk usually is provided at its rear face with reinforcing ribs which contact the shavings and impel them outward against the surrounding wall of the housing. Impact of the shavings with the ribs of the disk and the wall of the housing causes high breakage of the shavings, which is objectional, particularly if the shavings are to be used in panels or other purposes for which shavings of generally uniform size are desirable. Also, in the known machines, the knife disk frequently is subject to substantial vibration or oscillation axially rendering it difficult to obtain shavings of uniform thickness and causing excessive wear of the knives and associated scrapers.

One of the objects of my invention is to avoid the above noted objections to the known machines. A further object of my invention is to provide a machine suitable for producing chips, shavings and excelsior. Further objects and advantages of my invention will appear from the detail description.

In the drawings:

FIGURE 1 is a fragmentary front view of the cutter head of a wood cutting machine embodying my invention;

FIGURE 2 is a sectional view taken substantially on line A–B of FIGURE 1;

FIGURE 5 is a front view of a modified form of a wood cutting machine embodying my invention;

FIGURE 6 is a plan view of mounting means for the cutter head of the machine of FIGURE 5;

FIGURE 7 is a sectional view taken substantially on line J–K of FIGURE 6, certain parts being shown in elevation, and including the cutter head and housing;

FIGURE 8 is a fragmentary sectional view of a second modified form of wood cutting machine embodying my invention; taken substantially on line L–M of FIGURE 9;

FIGURE 9 is a sectional view taken substantially on line N–O of FIGURE 8;

FIGURE 11 is a fragmentary sectional view of a third modified form of machine embodying my invention, taken substantially on line P–Q of FIGURE 12; and FIGURE 12 is a sectional view taken substantially on line R–S of FIGURE 11, certain parts being shown in plan.

Figure 3:
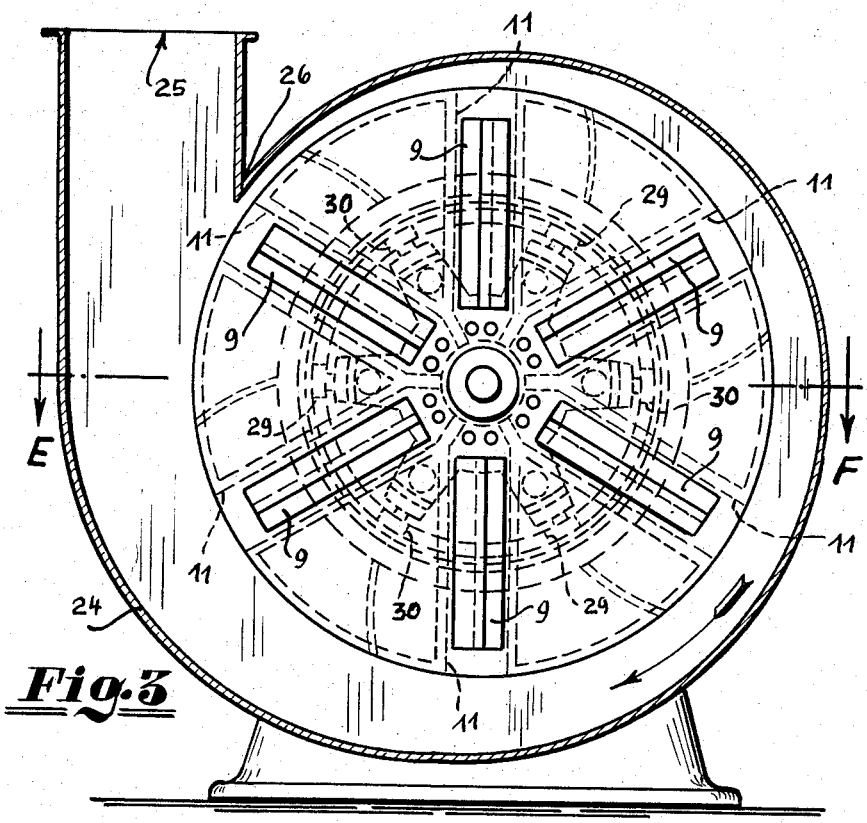
FIGURE 3 is a front view of the machine of FIGURES 1 and 2 with the cutter head housing shown in section; taken substantially on line C–D of FIGURE 4.

Referring to FIGURES 1 to 4, inclusive, the machine has a cutter head 1 comprising coaxial front and rear disks 12 and 13, respectively, connected by web elements 14 defining between them passages or channels 9 disposed substantially radially of head 1 and opening at their outer ends 11 into a spiral housing 24 providing about head 1 an air space or passage increasing in width or radial extent from a restricted area 26 thereof to a discharge opening 25 of housing 24. The cutter head 1 is provided with a central hub which is fixed on shaft 2, indicated in FIGURE 4 by the dot and dash line 2—2, mounted in a bearing block 23 of a supporting pedestal. An electric motor 21, suitably mounted on the pedestal, has the V-belt driving connection 22 to shaft 2 effective for rotating the cutter head 1 in clockwise direction, as indicated by the arrow in FIGURE 3.

The front disk 12 is provided with openings overlying the channels 9 and with recesses extending about such openings for reception of knife carrying insert for plates 5 removably secured in such recesses. Each of the inserts 5 carries the cutting knife 3 and a scraping knife 4 disposed in parallel spaced relation and defining between them a slot 8 opening into the corresponding passage or channel 9.

Figure 4:
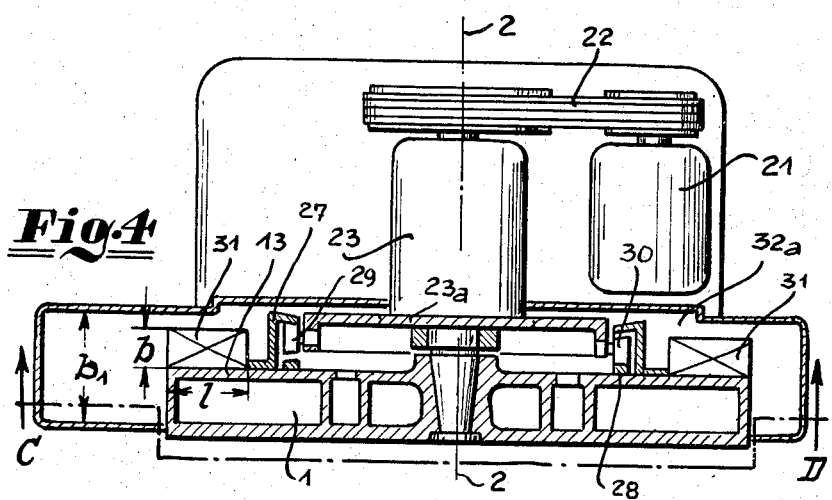
FIGURE 4 is a sectional view taken substantially on line E–F of FIGURE 3, with certain parts shown in plan.

An annular track member 27 of substantially Z-shape in cross section, is fixed to the outer face of disk 13 of cutter head 1 in concentric spaced relation to the hub thereof. An inner track member 28 is also secured to the outer face of disk 13 in concentric spaced relation to outer member 27 and spaced a short distance radially inward therefrom. The track members 27 and 28 receive between them rollers 29 and 30 mounted on stub shafts secured in the circumferential flange of an annular supporting plate or member 23A secured to the forward end of journal block 23 and disposed in concentric relation to, and spaced a short distance radially inward from, the track member 27. The track members 27 and 28, in cooperation with the rollers 29 and 30 and the support 23A effectively restrain the cutter head 1 against oscillation or vibration axially. The web elements 14 defining the channels 9 and connecting the disks 12 and 13 impart desirable strength and rigidity to the head 1 and further guard against objectionable deflection or deformation thereof. As shown more clearly in FIGURES 1 and 2, the web elements 14 are connected to the hub of head 1 and each two adjacent web elements 14 are connected together, a short distance from their inner ends, by a cross web element. The disks 12 and 13 of head 1 are provided with suitably disposed openings 10 through which air is admitted freely to the passages or channels 9 at the inner end portions thereof. Preferably a plurality of suitably disposed blades or vanes 31 are secured to the outer face of disk 13 adjacent the periphery thereof. Referring to FIGURE 4, the width and the length of the respective vanes 31, indicated by $b$ and $l$, and the depth or thickness of the housing, indicated by $bl$, may be varied to suit requirements.

With the cutting head 1 rotating in clockwise direction, the wood H is pressed, in a suitable known manner, against the outer face 6 of the disk 12, preferably at the area thereof to the right of the hub and substantially in the horizontal plane of the axis of said head 1, the direction of application of pressure to the wood H being indicated by G in FIGURE 2. As the cutter head 1 rotates shavings 7 cut from the wood H pass through the slots 8 into the passages or channels 9 and are discharged through the radially outer open ends 11 thereof into the space between head 1 and housing 24. During such a rotation of head 1 air is induced through the openings 10 into the channels 9, as indicated by the arrows L in FIGURE 2, such air flow impelling the shavings outward of channels 9 into the housing 24, the vanes 31 also causing air flow outwardly of head 1 radially thereof into the housing 24 and through the latter towards the discharge opening 25 thereof. The flow of air about the interior of the housing 24 due to the vanes 31 picks up the shavings that discharge from the channels 9 and guards against impact thereof with the housing wall, thereby avoiding objectionable breakage of the shavings. As will be understood, before any one of the passages or channels 9 reaches a position adjacent the restriction 26 of the housing 24 all of the shavings have been completely discharged from such passage and there is no risk of breakage of the shavings at this point.

In the modified form of my invention shown in FIGURES 5, 6 and 7, the cutter head and the housing are similar to those shown in FIGURES 1 to 4, inclusive, and are shown rather diagrammatically and in rear view in FIGURE 5. The cutter head and housing are supported on uprights 31' extending from a base plate 31. A cross shaft of stepped formation, numbered 2', has its ends clamped to the bearing jacks or uprights 31' by cap plates secured thereto by bolts 34. The cutter head 1 is fixed on a hollow shaft 32 rotatably mounted on shaft 2' by antifriction bearings, including roller bearings 33 and 33'. The motor 21 is mounted on one of the jacks or uprights 31' and has the V-belt driving connection to a pulley 35 fixed to the rear disk 13 of cutter head 1. The shaft 2' serves as a strut connecting the uprights or jacks 31' providing a rigid supporting unit or frame effectively preventing objectionable vibration of the cutter head such as might otherwise be caused by the forces and impacts occurring when cutting the wood. Also, the hollow shaft 32 is not stretched by torsion and torsion effects detrimental to the cutting operation are eliminated.

The modified form of the machine shown in FIGURES 8 and 9 is particularly suitable for cutting chips and flakes from waste lumber pieces of appreciable length lengthwise thereof. The cutter head 1a is rotatably mounted on shaft 2a and is driven in the direction indicated by the arrow in FIGURE 8. The front disk of head 1a has mounted thereon knife inserts 5a carrying cutting knives 3a the cutting edges of which project outwardly a suitable distance beyond the front disk and define with the adjacent edge of a corresponding opening in that disk slots through which the cut chips or slabs pass. Such slots overlie passages or channels between the disks respectfully formed by a leading web element 14a connecting the disks and a following web 44. The web 14a is disposed substantially radially of head 1a and the web 44 comprises a radially inner portion paralleling web 14a and an outer portion disposed substantially at right angles to the inner portion and extending therefrom to the periphery of the cutter head 1a. The outer portion of web 44 may be straight as shown or may be curved and the inner end thereof is disposed in proximity to the radially inner end of the corresponding knife 3A.

The lengths of lumber to be cut, H, are placed in the boxing 41 at the lower central portion of the cutter head 1 and are held in pressure contact with the outer face of the front disk of head 1A by a follower or plunger 42 operated in a suitable known manner. In the rotation of the cutter head 1A shavings 43 are cut from the pieces of lumber and are directed into the passages 9A. As will be seen from FIGURE 8, the passages 9A have flaring outer portions and the outer portion of the respective webs 44 approximately parallels the direction of travel of the shavings 43 entering passage 9A. Preferably each of the passages 9A is provided with front and rear guide panels 45 and 46 extending between the web elements 14A and 44 at an inclination and opening into housing 24 surrounding the cutter head 1A. The panels 45 and 46 guide the shavings into the housing 44 and prevent contact thereof with the circumferential flanges or rims of the disks of the cutter head thereby guarding against the breakage of the shavings.

Figure 10:
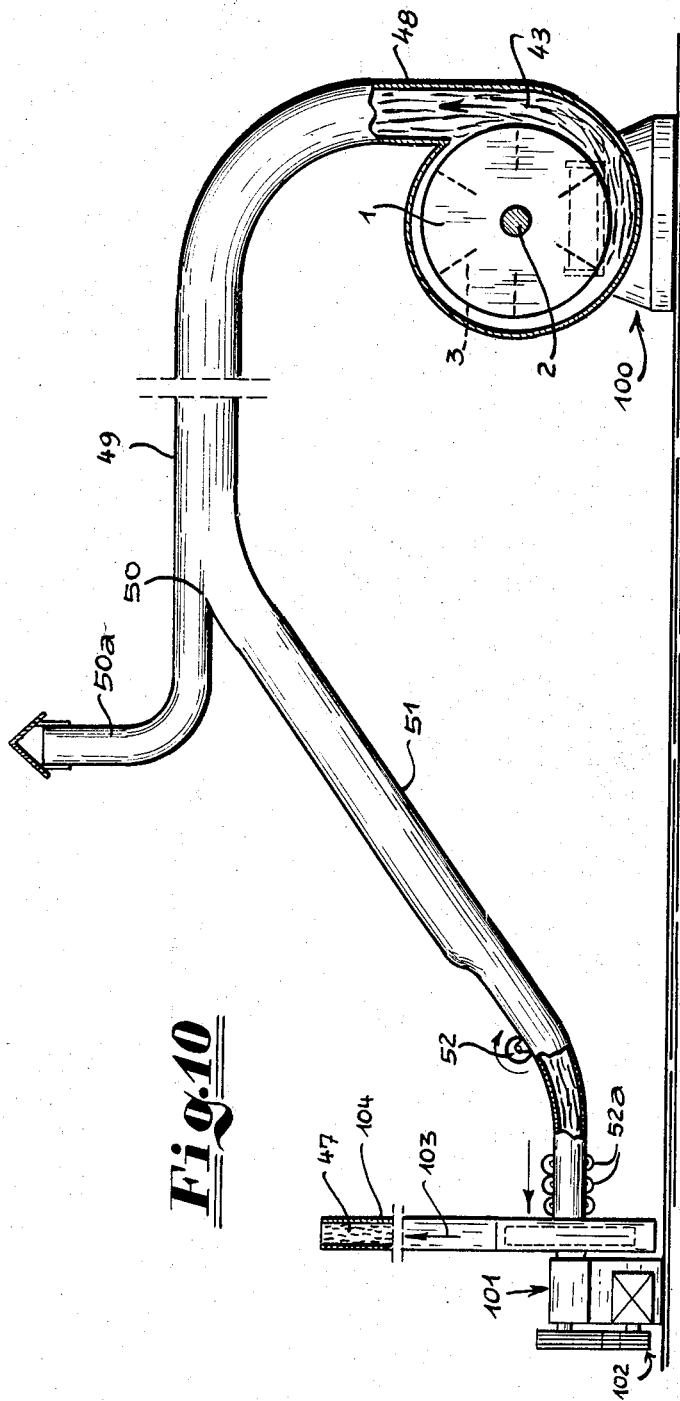
FIGURE 10 is a semi-schematic side view, partly broken away and in section, of the machine of FIGURES 8 and 9 and associated means for conducting the shavings to a cutting machine for cutting them into relatively short lengths.

Referring to FIGURE 10, the cutting machine 100 may be similar to that of FIGURES 8 and 9. The long shavings 43 are discharged from that machine through conduit 48 upwardly into a substantially horizontal conduit 49, shown as an extension of conduit 48. A conduit 50A, joining conduit 49 at 50, permits the escape from the latter conduit of the shavings conveying air discharged into conduit 48 from machine 50. From the point 50 the shavings flow by gravity downward through a downwardly inclined conduit 51 extending into conduit 49 and having a reduced lower end portion. The shavings passing through the lower reduced portion of conduit 51 are gripped and compressed to a certain extent by rollers 52 which are effective for feeding the shavings to rollers 52A which further compress the shavings and deliver them to a chopping machine of suitable type which machine 101 may be power driven as indicated at 102. The chopping machine cuts the shavings to shorter length and discharges them upward, as indicated by the arrow 103, to a conduit 104 from which the short lengths or chips are delivered to a suitable point of discharge.

The modified form of machine shown in FIGURES 11 and 12 is particularly adapted for the production of excelsior from pieces of lumber of considerable length. The cutter head 1b is similar to that of FIGURES 8 and 9 and is indicated in FIGURE 11 as having the radius $r$. It comprises front and rear disks connected by web elements providing discharge passages and air flow channels into which air inlet ports in the disks open. The head 1b is rotated in counterclockwise direction as viewed in FIGURE 11 and the angularly disposed portion 44b of the respective following web elements are provided with air discharge openings 48b, the areas of the disks between each of the leading web elements and the next preceding following web element being provided with air inlet openings 47. The outer or front disk of the head 1b is provided, adjacent the radially outer end portion of each of the leading web elements with a knife mounting member or insert which carries a scraping 4b and a cutting knife 3b, spaced apart in parallel relation providing a slot therebetween for entry of the cut strands of excelsior into the outlet or discharge area of the underlying passage or channel.

The lengths of lumber H to be cut, having a substantial length L, are placed in a suitable frame or boxing disposed adjacent the lower portion of the front disk of head 1b at the bottom thereof. The boxing is of open top construction and comprises a bottom wall 50b, a fixed side wall 53b and a movable side wall 52b adjustable by suitable means toward and away from wall 53b, to accommodate different lengths of the pieces of lumber. The boxing also includes front and rear walls secured to the side wall 53 and spaced above the bottom wall 50b. The upper portion of the boxing receives a follower 51b of rectangular shape in plan and approximately corresponding in width and length to the interior dimensions of the boxing. The plunger 51b is secured to the lower end of a piston rod operated in a suitable known manner for raising and lowering the plunger or follower 51b. The upper surface of bottom wall 50b of the boxing is concaved and curved on a radius $r-a$, such surface being concentric with the axis of the head 1b. The lower face of follower 51b is convex, curved on a radius $r-A$, and is also concentric with the axis of the head 1b. The pieces of lumber H are placed in the boxing, being disposed lengthwise between the walls 53b and 52b and are then subjected to pressure by the follower 51b being thereby bent or curved lengthwise concentrically with the axis of the cutter head 1b. The lumber H is then forced toward the cutter head at a proper rate and under proper pressure by a follower 54 having a height A approximately the same as that of the pile or stack of the lumber H, by means of piston rod 51b of a pressure cylinder, or in any suitable manner. In the rotation of the cutter head 1b, in counterclockwise direction as viewed in FIGURE 11, the scraping knives 4b first engage the lengths of lumber H and cut grooves therein which determine the width of the threads of excelsior, and immediately thereafter the cutting knives cut the strips of excelsior from the lengths of wood, the excelsior being discharged through the discharge openings or channels A in the manner previously described.

It will be understood that changes in detail may be resorted to without departing from the field and scope of my invention, and I intend to include all such variations, as fall within the scope of the appended claims, in this application in which the preferred forms only of my invention have been disclosed.

I claim:
1. In a wood cutting machine having a rotatably mounted cutting head and means for rotating said head in one direction, said cutting head comprising spaced front and rear disks, means between said disks providing channels having discharge openings adjacent the circumference of said head, and means comprising cutting knives and providing slots respectively opening into said channels for delivery thereto of the cuttings from said knives, said cutting head having at the central area thereof means for admitting air to said channels for outward flow therethrough for discharge of said air and cuttings through said discharge openings.

2. A wood cutting machine according to claim 1 in which the channels are provided by pairs of spaced web members connecting the disks and discharge into a spiral housing extending about said head and defining therewith a space increasing in radial extent in the direction of rotation of said head.

3. A wood cutting machine according to claim 1 in which concentric roller tracks are secured on the outer side of the rear disk and spaced apart axially of said head, and rollers mounted on fixed supporting means extend into the axial space between said tracks in bearing contact with the later effective for restraining said head against axial vibration.

4. A wood cutting machine according to claim 2 in which vanes are mounted on the outer face of the rear disk within said housing and are effective for delivering thereto additional air.

5. A wood cutting machine according to claim 1 in which the cutter head is secured on a hollow shaft rotatably mounted on a fixed shaft extending between and fixed to uprights extending from a base, said fixed shaft providing a rigid strut connecting said uprights.

6. A wood cutting machine according to claim 2 in which the pairs of web members respectively comprise a leading web member and a following web member relative to the direction of rotation of said head, with the leading web member extending substantially radially of the head and the following web member having a radially inner portion substantially parallel with said leading web member and an outer portion extending from said inner portion substantially at right angles thereto and away from said leading web member, said outer portion of said following web member extending from adjacent the radially inner end of the corresponding knife in approximately the direction of flow of the cuttings from said knife.

7. A wood cutting assembly comprising a cutting machine according to claim 2 and comprising a chopping machine for cutting into relatively short lengths the cuttings from said cutting machine, and conduit means for delivering cuttings from said cutting machine to said chopping machine.

8. A wood cutting machine according to claim 1 in which the respective channels are provided with guide panels extending between the web members thereof and spaced axially inward from the front and rear disks, said panels defining discharge passages for the cuttings from the knives.

9. A wood cutting machine according to claim 1 in which a receptacle is provided adjacent the front disk of the cutter head for receiving pieces of wood of substantial length, and means is provided for bending the lengths of wood lengthwise to a curvature concentric with the axis of the head and advancing them in edgewise pressure contact with the outer face of said front disk.

References Cited

UNITED STATES PATENTS

| 3,030,987 | 4/1962 | Jackson et al. | 144—176 X |
| 3,037,712 | 6/1962 | Hosokawa et al. | 241—56 |
| 3,101,756 | 8/1963 | S'Chubert | 144—176 |
| 3,276,700 | 10/1966 | Eklund | 241—55 |

WILLIAM W. DYER, Jr., *Primary Examiner.*

W. D. BRAY, *Assistant Examiner.*